March 17, 1970    H. DE PLANTE    3,501,114
JACK SYSTEM APPLICABLE TO WING CONTROL OF
VARIABLE GEOMETRY AIRCRAFT
Filed Dec. 18, 1967    2 Sheets-Sheet 1

INVENTOR
Henri Deplante

March 17, 1970  H. DE PLANTE  3,501,114
JACK SYSTEM APPLICABLE TO WING CONTROL OF
VARIABLE GEOMETRY AIRCRAFT
Filed Dec. 18, 1967  2 Sheets-Sheet 2

INVENTOR
Henri Deplante

United States Patent Office 3,501,114
Patented Mar. 17, 1970

3,501,114
JACK SYSTEM APPLICABLE TO WING CONTROL
OF VARIABLE GEOMETRY AIRCRAFT
Henri Deplante, Paris, France, assignor to Avions Marcel
Dassault, Saint-Cloud, France, a company of France
Filed Dec. 18, 1967, Ser. No. 691,348
Claims priority, application France, Feb. 28, 1967,
96,823
Int. Cl. B64c *3/40, 13/42*
U.S. Cl. 244—46
2 Claims

ABSTRACT OF THE DISCLOSURE

This invention relates to a mechanical jack device for controlling elements to be moved in a related manner, for example the wings of a variable geometry aircraft, and comprises two coaxial nut and screw assemblies simultaneously operable by means of a drive element, the coupling between the drive element and the nuts being arranged, in conjunction with the threading in said assemblies, to produce translational movements of the screws in mutually opposite directions in accordance with the direction of operation of said drive element.

---

The invention relates primarily to a fast-action mechanical jack device.

This jack is suited in particular to the control of moving elements which must execute movements symmetrically to either side of a plane in relation to which said elements are themselves symmetrically disposed.

The jack is thus advantageously applicable to control of the wings of variable geometry aircraft, and this application also forms the subject of the invention.

The jack according to the invention comprises two coaxial screw and nut assemblies, the screws of which are in axial alignment and are connected to a drive motor which drives them simultaneously so that the respective screw threads produce mutually opposite translational movements of the screws themselves so that, in accordance with the direction of rotation of the motor, the jack extends or retracts.

In accordance with a practical embodiment, the two nuts associated with the respective screws, one of which is preferably hollow in order to enable the other to telescope into it, are fixedly carried by a single component which embraces the screws and is mounted to rotate about the common axis of the screws in a fixed housing within which the motor mechanism transmits motion to the said component.

The fixed housing preferably contains guides which enable the screws to translate under the action of the double rotating nut, but prevents them from rotating.

In the particular application with which the invention is concerned, that of a variable geometry aircraft, the jack is fixed to the fuselage in such a fashion that the common axis of the screws is perpendicular to the longitudinal plane of symmetry of the aircraft, this plane being the general plane of symmetry of the system, and the tips of the two screws can be connected, for example by pivotal links, to the wings, which are themselves pivotally attached to the fuselage. The double-nut component in this case receives its rotative movement from two motors which normally operate in parallel, so that operation of the jack is ensured even if one of the motors should break down.

The motors used will preferably be hydraulic.

Figure 1:
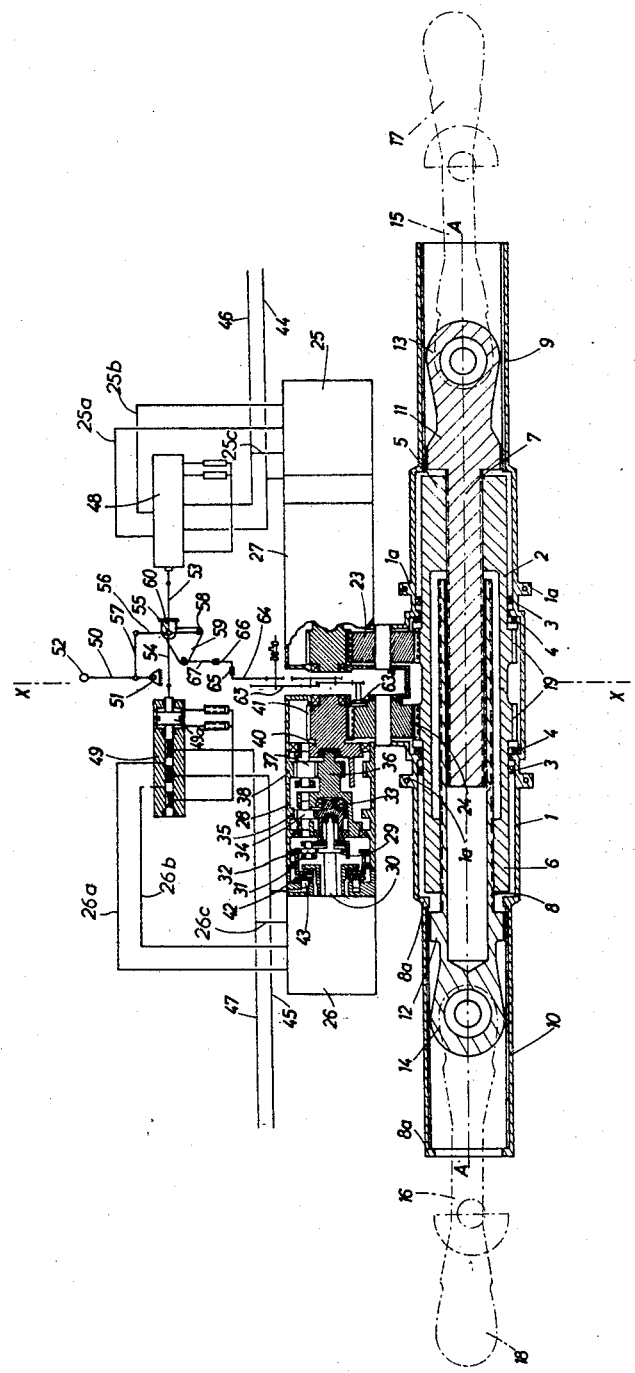
Figure 2:
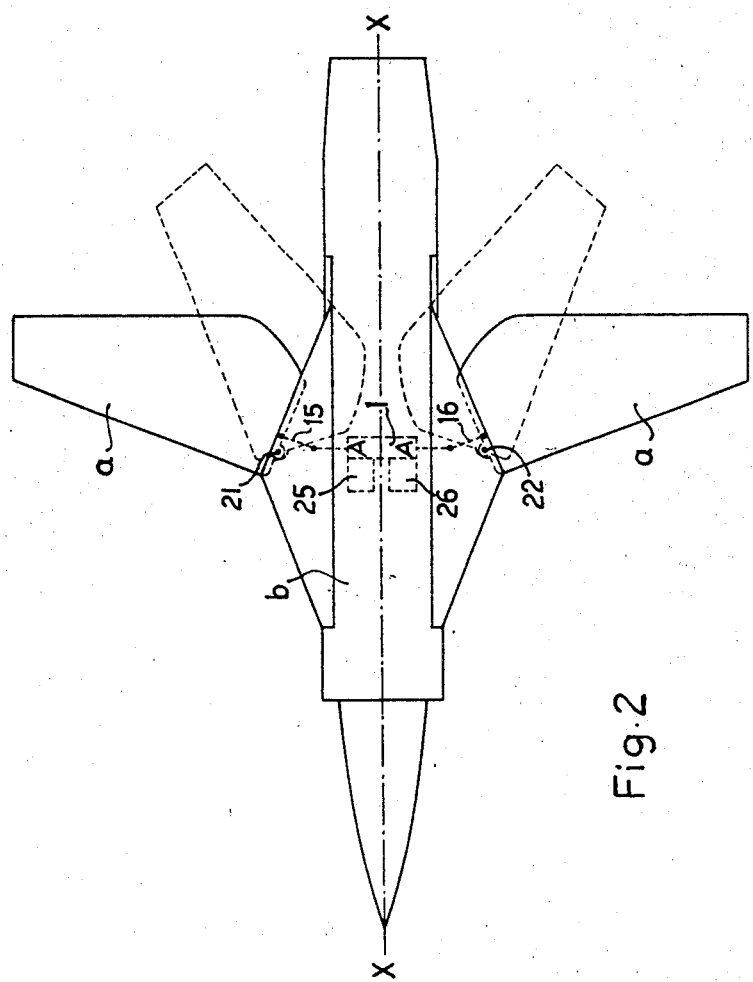

The invention may be carried into practice in various ways, but a practical embodiment of jack device and its application to wing control of a variable geometry aircraft will now be described by way of example with reference to the accompanying drawings, in which:

FIGURE 1 illustrates in axial section a preferred embodiment of jack device in accordance with the invention, and FIGURE 2 is a horizontal projection of a variable geometry aircraft, illustrating the application of the jack to such an aircraft.

The jack illustrated in FIGURE 1 comprises a fixed housing 1, of generally cylindrical form, in which is arranged a hollow cylindrical unitary component 2 which can rotate about the axis A—A of the assembly, this component being axially centre in the housing 1 by roller bearings 3 and being longitudinally located by roller thrust bearings 4. The said component 2 is formed at each of its extremities 5, 6, as a nut co-operating with a screw 7 or 8 as the case may be (the threads of nuts and screws not being shown in the drawing). The axes of the two screws are collinear with the axis A—A of the assembly, and the screw 8, which is of larger diameter than the screw 7, contains a cylindrical smooth-walled bore, in which the screw 7 can rotate and move axially.

At each end, the housing 1 is formed with cylindrical extensions 9, 10, the internal walls of which contain longitudinal splines co-operating with similar splines formed on shoulder portions 11, 12 integral with the respective screws 7, 8. These splines enable the screws to move translationally along the axis A—A, but prevent said screws from rotating.

The hand of the threads in nut 5 and on screw 7 is opposite to the hand of the threads in nut 6 and on screw 8, so that when the component 2, 5, 6 rotates about the axis A—A, the screws 7, 8 move apart or towards one another, in accordance with the direction of rotation. The thread pitches are however, the same in both nut and screw assemblies, so that the translational movements of the screws 7, 8 are symmetrical in relation to the plane X—X, which is the general plane of symmetry of the system.

The screws 7, 8 terminate in yokes 13, 14 by means of which they are connected to links 15, 16 the extremities 17, 18 of which are connected to control elements which are thus caused by the jack to execute symmetrical movements relative to the plane X—X.

Stops 8a limit the extension and retraction of the jack. As illustrated, these stops may be designed to operate on only one of the two screws, co-operating for example with the splined shoulder 12 of the screw 8.

The cylinder 2 carries, for the purpose of effecting its rotation, gear teeth 19, which engage with a gear linked to a motor, as will be explained hereinafter.

The drawing illustrates the particular case of application of the jack to control the symmetrical movements of the wings of a variable geometry aircraft.

In this case, the plane X—X is the longitudinal plane of symmetry of the aircraft. The housing 1 of the jack is fixed to the fuselage *b* of the aircraft by means of the lugs 1a, the axis A—A being directed perpendicularly in relation to the longitudinal plane of the aircraft, and the links 15, 16 are articulated to the wings *a*, the latter being mounted to pivot at 21, 22 in relation to the fuselage of the aircraft (see FIGURE 2), between the position drawn in full-line and that shown in broken-line.

The jack device above-described has numerous advantages for this application. First of all, it enables the positional error of one wing relative to the other to be reduced to a minimum, the two screws of the jack being directly linked to the wings and to a unitary driving component (as later described).

Moreover, since, in normal operation, the forces exerted on the wings are symmetrical, the body of the jack is subjected only to moderate loading and therefore only transmits moderate loadings to the fuselage through the fixing lugs 1a.

In the event that the loadings on the two wings should be asymmetrical, the body of the jack merely transmits to the fuselage the difference between the loadings in question.

On the other hand, the concentric arrangement of the two screws of the jack enables the distance between the two yokes 13 and 14, arranged at the ends of the screws, to be reduced to a minimum. Thus, each wing can be connected to the corresponding yoke through a long link, thus reducing the magnitudes of the radial force components exerted on the screws and on the jack itself, as a consequence of the differing inclinations of these links throughout the full range of deployment of the wings.

For reasons of safety, it is preferred to provide two identical parallel-operating motors for operating the jack. The gear toothing 19 of the cylinder 2 is thus provided in duplicate, as shown in FIGURE 1, in order to engage with two gears 23, 24 driven by respective motors 25, 26 through reduction gearing 27, 28.

The drawing shows by way of example epicyclic gear trains in use as the reduction gearing. These reduction gears each embody three epicyclic gear stages. The first stage includes a central gear 29 (which is fixed to a drive shaft 30), planet gears 31 and an external gear ring 32. The second stage includes a central gear 33 (which is fixed to an arm carrying the planet gears 31 of the first stage), planet gears 34 and a fixed gear ring 35. The third stage includes a central gear 36 (which is fixed to an arm carrying the planet gears 34 of the second stage), planet gears 37 and a fixed gear ring 38. The arm 40 carrying the planet gears 37 also carries an output gear 41 meshing with the gear 24 or 23, as the case may be, which in turn meshes with the gear toothing 19 on the cylinder 2.

The gear ring 32 of the first stage can rotate in the reduction gear housing. It is normally held stationary by a releasable coupling device 42 comprising one or more plates locked in relation to the said gear ring 32 by the application of a removable force, for example the force developed by application of oil pressure to a piston 43. The removal of this force, in either of the reduction gears, allows the respective gear ring 32 to free-wheel, thus mechanically isolating the corresponding motor in the event of breakdown or jamming, so that the jack can be operated by the remaining motor without the latter having to drive the motor which has failed.

Preferably, the motors 25, 26 will be positive displacement (cylinder and piston) hydraulic motors. Each such motor is associated with a separate supply circuit comprising a high pressure line 44 or 45 (this leading from a source of hydraulic pressure which is not shown), a low pressure return line 46 or 47, and a control multi-spool valve 48 or 49. The spools of the valves 48 and 49 are coupled through links to a common lever 50, which pivots about a fixed point 51 and is itself connected at 52 to a linkage system (not shown), which terminates with a control element in the aircraft cockpit.

Each motor, 25 or 26 as the case may be, is connected to its valve through high pressure lines 25a, 25b or 26a, 26b, the two lines for each motor corresponding to the two possible directions of rotation. The return line 46 or 47 also communicates with the cylinder of a dashpot such as 49a, the piston of which is connected to the spools of the valve 48 or 49. Any abrupt reversal of operation of the system—which could lead to too great a mechanical strain on its various components—is thus avoided. Low pressure lines 25c, 26c connect the motors 25, 26 with the respective return lines 46, 47. The input lines 25a and 26a correspond to a predetermined sense of rotation of the two motors, and therefore of the cylinder 2 of the jack. The lines 25b and 26b respectively correspond to the opposite sense of rotation. In this way, movement of the lever 50 in one direction, about its pivot 51, causes the two motors and the jack cylinder 2 to rotate in one sense, whilst movement of the lever 50 in the opposite direction produces reverse rotation of the cylinder.

The valve spools are connected to the lever 50 through a feedback linkage. The links 53, 54 attached to the two spools are articulated at 55 to the centre of a lever 56 one end of which is connected through a link 57 to the lever 50 and the other end of which is articulated at 58 to a bellcrank 59 pivoting about a fixed mounting 60. The axis of articulation of this bellcrank 59 on the mounting 60 coincides geometrically with the axis of articulation 55 of the links 53 and 54 on the lever 56 when the control system is in the neutral position (as shown in FIGURE 1). The position of the bellcrank 59 in relation to the fixed mounting 60 is rendered dependent upon the rotation of the cylinder 2 of the jack, through the medium of a train of reduction gears 63 schematically shown in the drawing and deriving movement at 63a from one of the gears 23, 24. This train of gears terminates in a toothed sector 64, pivoting about a fixed axis 65 and integral with a lever 66 connected by a link 67 to the bellcrank 59 so that any pivoting movement on the part of the toothed sector 64, about its axis 65, produces pivotal movement of the bellcrank 59 relative to the fixed mounting 60.

When the pilot operates the control to move the levers 50 and 56 so as to move the valve spools 48 and 49 in a certain direction and cause the cylinder 2 of the jack to rotate in the corresponding sense, the axis of articulation 55 between the lever 56 and the links 53, 54 no longer coincides with the axis of the pivot of the bellcrank 59 to the mounting 60. However, the train of gears 63, simultaneously driven by the cylinder 2, causes the toothed sector 64 to pivot, and consequently the bellcrank 59 also, the movement being in a direction such that the axis of articulation 55 returns to its neutral position and likewise the spools of the valves. The rotational movement of the motors and of the cylinder 2 of the jack is thus stopped at the jack position which corresponds to the setting selected by the pilot.

In each reduction gear system, the piston 43 operating the releasable coupling 42 is subjected to the fluid pressure produced by the hydraulic source in the line 44 or 45 as the case may be. Consequently, in the event of hydraulic failure in one of the circuits, the corresponding hydraulic motor is disengaged from the mechanical transmission system, thus avoiding any power loss due to driving of the failed motor by the remaining motor, and therefore also avoiding any undesirable heating of the hydraulic fluid and the motor as a consequence of recycling of the small quantity of fluid which the motor contains.

Similarly, in the event that one of the motors seizes, it is possible by operating an auxiliary control which collapses the oil pressure on the piston 43 of the reduction gear system of this motor, to uncouple the jammed motor and continue to operate the wings using the other motor.

It will be apparent that the embodiments above-described are simply example and may be modified in various ways within the scope of the invention.

What is claimed is:

1. In a variable geometry aircraft including a fuselage with a longitudinal plane of symmetry and two wings movable with respect to the fuselage, a device for controlling the sweepback of the wings, said device comprising in combination a housing; two simultaneously operable coaxial screw and nut assemblies entirely receivable within said housing, viz. a right-hand threaded and a left-hand threaded assembly, each of said assemblies including a driving threaded element and a driven threaded element; means rigidly connecting together said driving elements, whereby a unitary driving component is formed; means locating said driving component for rotation in said housing about the common axis of the assemblies; thrust bearing means for axially locating said component with respect to said housing; means fixedly securing said housing to the aircraft fuselage with said common axis of the assemblies perpendicular to the longitudinal plane of symmetry of said fuselage; coupling means for connecting said driven threaded elements to the respective wings; spline means carried by said housing and splined portions formed on said driven elements, said portions co-operatiing with said spline means to prevent said driven elements from rotating; and a drive mechanism for rotating said unitary driving component.

2. A device as claimed in claim 1, wherein the driven elements of the screw and nut assemblies are screws one of which is hollow and the other is movable within it.

References Cited

UNITED STATES PATENTS

| | | | |
|---|---|---|---|
| 1,868,417 | 7/1932 | Hill | 244—46 |
| 2,428,934 | 10/1947 | Gille et al. | 244—46 |
| 2,699,300 | 1/1955 | Trotter et al. | 244—46 |
| 2,708,380 | 5/1955 | Mais | 254—102 X |
| 2,744,698 | 5/1956 | Baynes | 244—46 X |
| 2,988,307 | 6/1961 | Westbury | 244—85 |
| 3,071,336 | 1/1963 | Fearnside. | |
| 3,212,732 | 10/1965 | Scerbo et al. | 244—46 |
| 3,369,636 | 2/1968 | Nelson | 192—.098 X |

MILTON BUCHLER, Primary Examiner

J. L. FORMAN, Assistant Examiner

U.S. Cl. X.R.

74—89.15; 244—85; 254—102